United States Patent [19]
Watanaby

[11] Patent Number: 4,459,901
[45] Date of Patent: Jul. 17, 1984

[54] REAR SIDE WINDOW DEMISTER
[75] Inventor: Takeaki Watanaby, Ebina, Japan
[73] Assignee: Nissan Motor Co., Ltd., Yokohama, Japan
[21] Appl. No.: 402,346
[22] Filed: Jul. 27, 1982
[30] Foreign Application Priority Data
  Aug. 5, 1981 [JP] Japan .................. 56-123385
[51] Int. Cl.³ .............................. B60S 1/54
[52] U.S. Cl. ................................. 98/2.04
[58] Field of Search ....................... 98/2, 2.04
[56] References Cited
  U.S. PATENT DOCUMENTS
  4,109,562  8/1978  MacDonald ............ 98/2.04

FOREIGN PATENT DOCUMENTS
  2318097 10/1974  Fed. Rep. of Germany ....... 98/2.04
  2610050  9/1977  Fed. Rep. of Germany ....... 98/2.04
  2750671  5/1979  Fed. Rep. of Germany ....... 98/2.04

Primary Examiner—Albert J. Makay
Assistant Examiner—Harold Joyce
Attorney, Agent, or Firm—Leydig, Voit, Osann, Mayer and Holt, Ltd.

[57] ABSTRACT

A pillar garnish cooperates with a center pillar to define therebetween a space which serves as a demister duct for conveying hot, dry air directed from a side demister nozzle to a rear side window.

7 Claims, 2 Drawing Figures

REAR SIDE WINDOW DEMISTER

BACKGROUND OF THE INVENTION

1. Field of the Invention

The present invention relates in general to a side window demister or defroster for an automotive vehicle having a center pillar and a rear side window behind the center pillar, and particularly to a rear side window demister for preventing condensation on the interior of the rear side window.

2. Description of the Prior Art

FIG. 1 is a horizontal section of a typical center pillar and pillar garnish assembly 10 placed between a front door window 12 and a rear door window 14, i.e., a front side window and a rear side window. The center pillar is generally indicated at 16 and formed from inner and outer panels 18 and 20 which are joined together to constitute a closed configuration or a box-like horizontal section. The center pillar 16 has front and rear end flanges 16a and 16b where the inner and outer panels 18 and 20 are spot-welded or otherwise secured together. Though not shown, the upper and lower ends of the center pillar 10 are respectively secured to a roof side rail and a side sill to serve as a highly rigid structural member of a vehicle body. The pillar garnish is indicated at 22 and adapted to cover the center pillar 16 in order to attain a refined appearance of a passenger compartment 24. The pillar garnish 22 is hooked at the front and rear by hook-shaped ends 22a and 22b on to the front and rear end flanges 16a and 16b of the center pillar 16 and also secured at an intermediate portion between the front and rear hook-shaped ends 16a and 16b to the center pillar 16 by means of suitable fasteners 26.

The automotive vehicle with such a center pillar and pillar garnish, however, encounters a drawback of poor rear side visibility. That is, in winter or in a rainy season, the front and rear side windows 12 and 14 are likely to be clouded up due to condensation on the interior thereof. In order to prevent such condensation, recently produced cars are equipped with a side demister which includes a demister nozzle located at a lateral end of an instrument panel or on a front pillar. When the side demister is used, hot, dry air directed from a heat source is forced against the front side window 12 to remove mist or moisture or the like as well as to prevent condensation. The hot, dry air also flows rearwardly along the front side window 12, i.e., toward the center pillar 16. In this instance, since the center pillar 16 and the pillar garnish 22 are located more interiorly of the passenger compartment 24 as compared with the front and rear side windows 12 and 14, the hot, dry air having reached the center pillar 16 is caused to change its direction of flow as indicated by arrows in the drawing and flow away inwardly of the passenger compartment 24. For this reason, the hot, dry air discharged from the side demister cannot reach or blow against the rear side window 14, making it impossible to remove mist or moisture or the like on the interior of the rear side window 14 as well as to prevent condensation on same and therefore resulting in poor rear side visibility through the rear side window 14.

SUMMARY OF THE INVENTION

In accordance with the present invention, there is provided a rear side window demister for an automotive vehicle having a side demister nozzle installed on or adjacent a front pillar. The rear side window demister comprises a center pillar located between a front side window and a rear side window, and a pillar garnish attached to the center pillar for preventing same from view.

The above structure substantially follows the conventional fashion. In accordance with the present invention, the pillar garnish is adapted to cooperate with the center pillar to define therebetween a space which serves as a demister duct for conveying hot, dry air directed from the side demister nozzle to the rear side window.

With this structure, the hot, dry air having reached the center pillar is effectively conveyed to the rear side window to prevent condensation, thereby providing an improved rear side visibility through the rear side window.

It is accordingly an object of the present invention to provide a rear side window demister for an automotive vehicle which can provide an improved rear side visibility.

It is a further object of the present invention to provide a rear side window demister of the above mentioned character which is attained through a slight modification of a center pillar and pillar garnish assembly.

It is a further object of the present invention to provide a rear side window demistor of the above mentioned character which is adapted to effectively utilize hot, dry air blown from a nozzle of a side demistor which is standard-equipped in many recently produced cars.

BRIEF DESCRIPTION OF THE DRAWINGS

The features and advantages of the rear side window demister according to the present invention will become more clearly appreciated from the following description taken in conjunction with the accompanying drawings, in which.

DESCRIPTION OF THE PREFERRED EMBODIMENT

Figure 1:
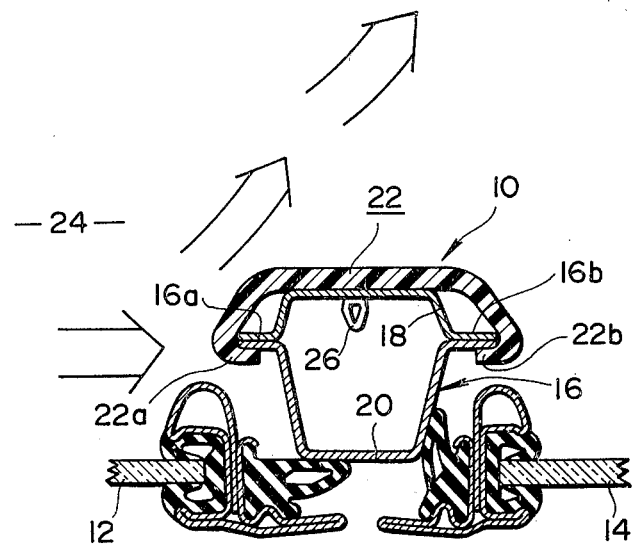
FIG. 1 is a horizontal section of a prior art center pillar and pillar garnish assembly and its associated parts and portions of an automotive vehicle.
Figure 2:
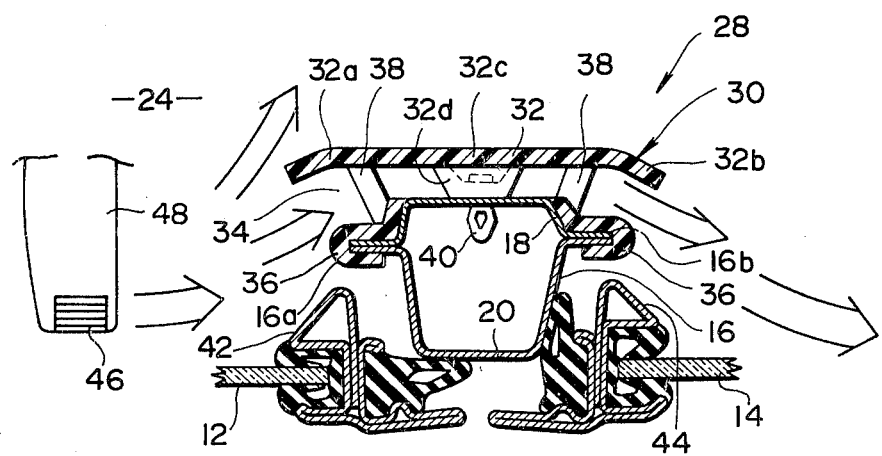
FIG. 2 is a view similar to FIG. 1 but shows an embodiment according to the present invention.

Referring now to FIG. 2, in which like parts and portions of those of the prior art structure of FIG. 1 are designated by like reference characters, a rear side window demister according to the present invention is generally designated at 28 and shown to comprise a pillar garnish 30 which is adapted to cover a center pillar 16 in order to attain a refined appearance of a passenger compartment 24.

The pillar garnish 30 has the form of a generally flat cover plate 32 placed over a center pillar 16 and spaced inwardly from same to define therebetween a space or passage 34, a pair of anchors 36 fitted on the respective front and rear end flanges 16a and 16b of the center pillar 16 and self-retained on same through their resiliency, and a plurality of connecting arms 38 interconnecting the anchors 36 and the cover plate 32.

More specifically, the cover plate 32 is slanted at the front and rear end portions 32a and 32b toward front and rear side windows 12 and 14 and has a substantially flat intermediate portion 32c between the slanted front and rear end portions 32a and 32c, which intermediate portion 32c is arranged substantially in parallel with the front and rear side windows 12 and 14. The cover plate 32 also has a plurality of projections 32d which protrude from the intermediate portion 32c toward the center pillar 16 and terminate at respective ends in contact with the center pillar 16. The projections 32d are provided for securing thereat the pillar garnish 30 to the center pillar 16 by means of fasteners 40.

The pillar garnish anchors 36 are hook-shaped to cover the respective front and rear end flanges 16a and 16b of the center pillar 16, and resiliently deformable for their installation and resiliently stiff for its retention. In this instance, when the pillar garnish anchors 36 can provide a sufficient retention force, the above described projections 32d and fasteners 40 can be dispensed with.

Preferably, the pillar garnish 22 is of a single piece made of a synthetic resinous material, i.e., the cover plate 32, self-retained anchors 36 and connecting arms are integrally made of a synthetic resinous material.

From the foregoing, it is to be understood that according to the present invention the pillar garnish 30 is adapted to have a function of defining the space 34 which serves as a demister duct for conveying the hot, dry air having reached the center pillar 16 to the rear side window 20 for preventing condensation on the interior of same, in addition to an intrinsic function of covering the center pillar 16 for thereby attaining a refined appearance of the passenger compartment 24.

It is further to be understood that the slanted front and rear end portions 32a and 32b of the pillar garnish 32 make it possible to effectively gather the hot, dry air having reached to the center pillar 16 and allow it to be forced against the rear side window 14, thus enabling the rear side window demister 28 to efficiently remove mist or moisture or the like on the interior of the rear side window 14 and also prevent condensation on same.

It is still further to be understood that the front and rear door frames which are respectively designated at 42 and 44 in FIG. 2, may preferably be shaped to deflect and guide a flow of air so that hot, dry air is conveyed to the rear side window 14 with an increased efficiency.

It is yet further to be understood that the rear side demister 28 of the present invention is used in conjunction with a known side demister which includes a demister nozzle 46 installed at a lateral end of an instrument panel 48 or installed on a front pillar though not so shown and can provide an excellent rear side visibility through the rear side window 14 though so simple in structure.

It is yet further to be understood that while the rear side window 14 have been described and shown as a rear door window, this is not limitative. For example, the rear side window 14 may be a swingable type rear window or a fixed rear window.

Obviously, many variations and modifications of the present invention are possible in light of the above teachings. It is, therefore, to be understood that within the scope of the appended claims, the invention may be practiced otherwise than as specifically described.

What is claimed is:

1. A rear side window demister for an automotive vehicle having a side demister nozzle installed on or adjacent a front piller, comprising:

a center pillar located between a front side window and a rear side window, said center pillar being formed from inner and outer panels which are joined together to form a box-like horizontal section having front and rear end flanges where the inner and outer panels are secured together; and a pillar garnish attached to said center pillar for concealing said center pillar from view;

said pillar garnish cooperating with said center pillar to define therebetween a space which serves as a demister duct for conveying air directed from said side demister nozzle to the rear side window, said pillar garnish having the form of a generally flat cover plate placed over said center pillar and spaced from the center pillar to define therebetween said space, a pair of anchors fixedly attached to the respective front and rear end flanges, and a plurality of connecting arms interconnecting said anchors and said cover plate.

2. A rear side window demister as set forth in claim 1, in which said pillar garnish cover plate is slanted at the front and rear end portions toward the front and rear side windows respectively.

3. A rear side window demister as set forth in claim 2, in which said pillar garnish cover plate has a substantially flat intermediate portion between said slanted front and rear end portions thereof, said intermediate portion being arranged substantially in parallel with the front and rear side windows.

4. A rear side window demister as set forth in claim 3, in which said pillar garnish cover plate also has a plurality of projections protruding from said intermediate portion toward said center pillar and terminating at respective ends in contact with said center pillar, said pillar garnish cover plate being secured at said projections by means of fasteners.

5. A rear side window demister as set forth in claim 1, in which said pillar garnish anchors are hook-shaped to cover the respective front and rear end flanges of said center pillar, and self-retained on same through their resiliency.

6. A rear side window demister as set forth in claim 1, in which said front and rear side windows are constituted by front and rear door windows whose door frame are shaped to deflect a flow of air so that air directed from said side demister nozzle is conveyed to the rear door window with an increased efficiency.

7. A rear side window demister as set forth in claim 1, in which said pillar garnish is of a single piece made of a synthetic resinous material.

* * * * *